UNITED STATES PATENT OFFICE.

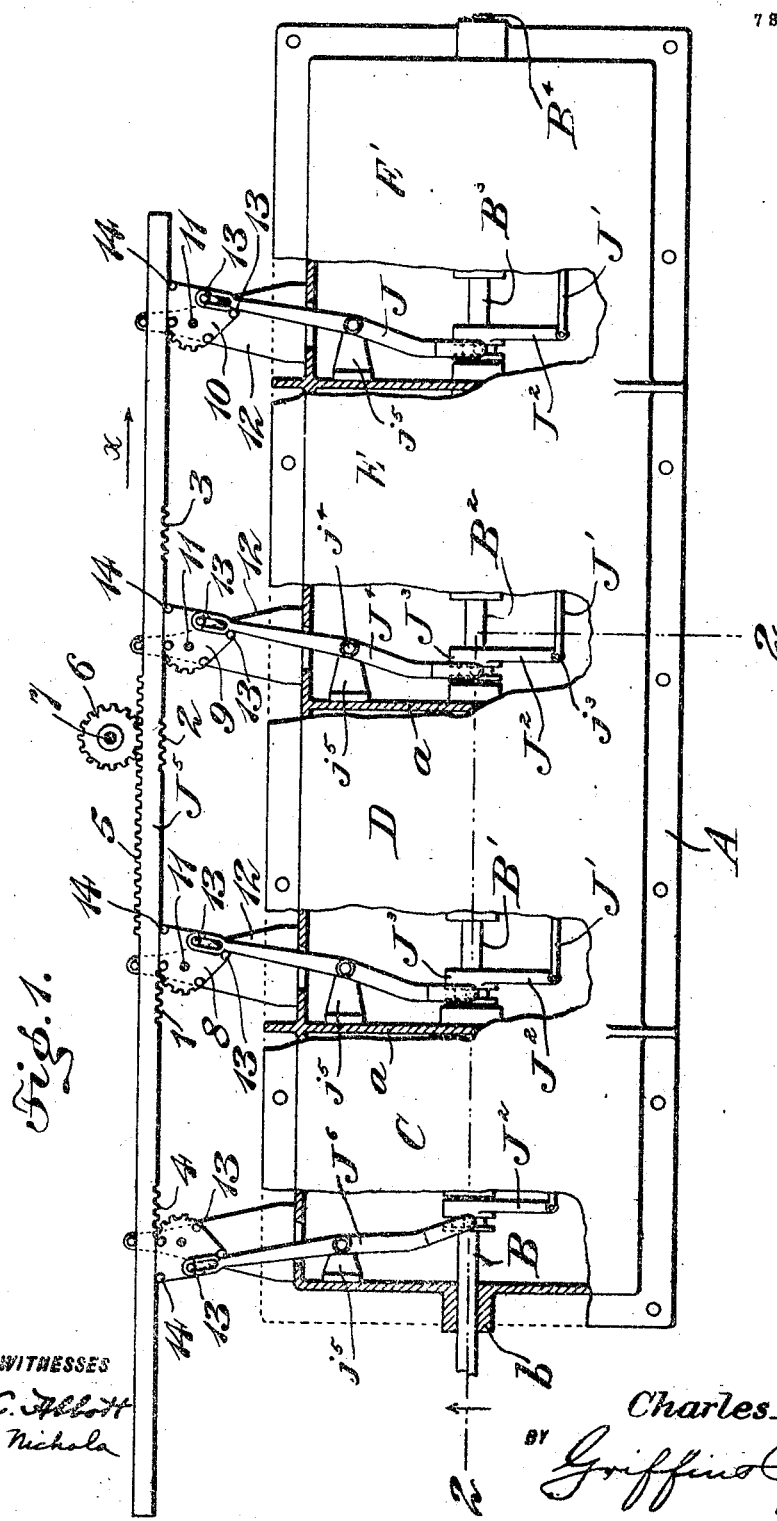

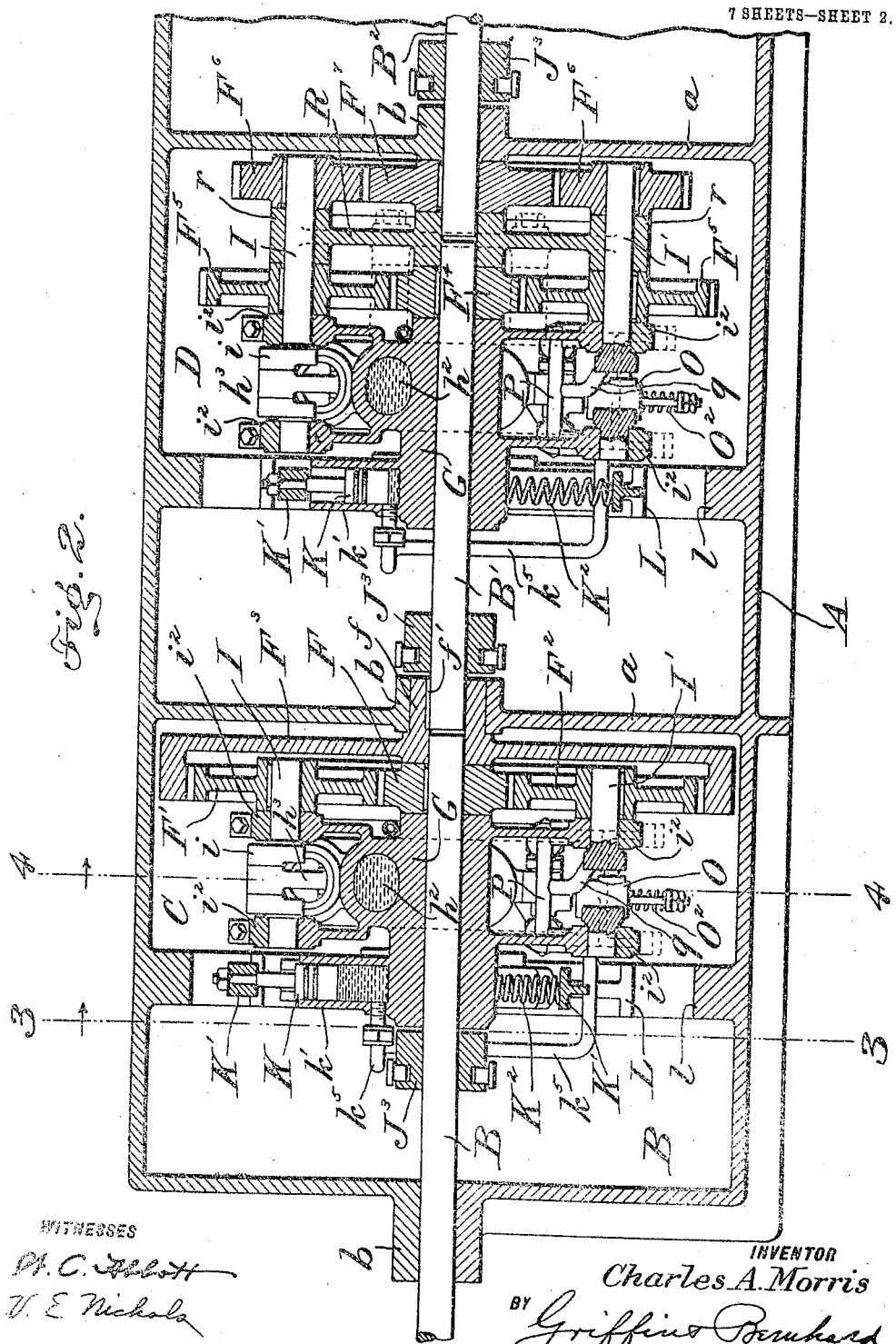

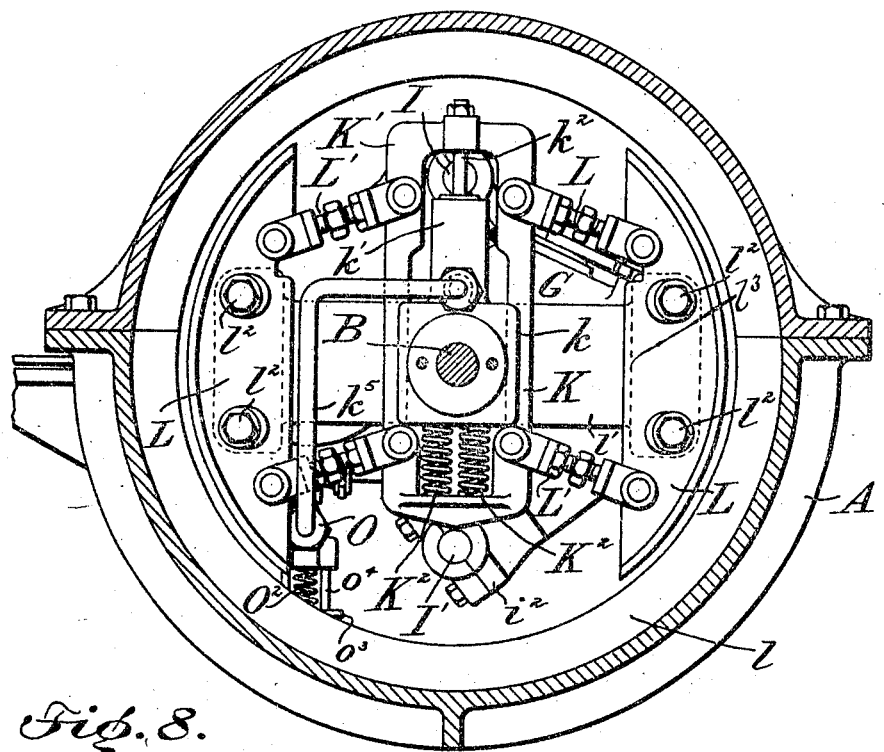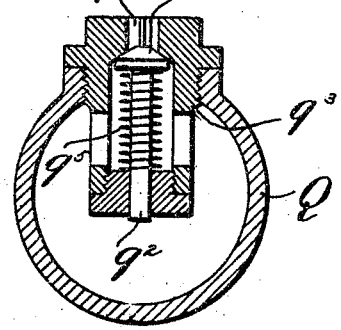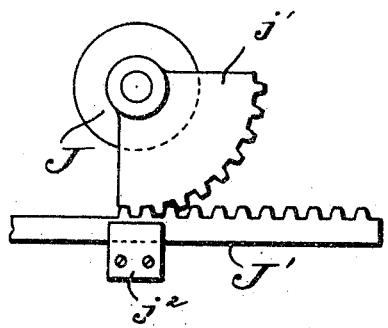

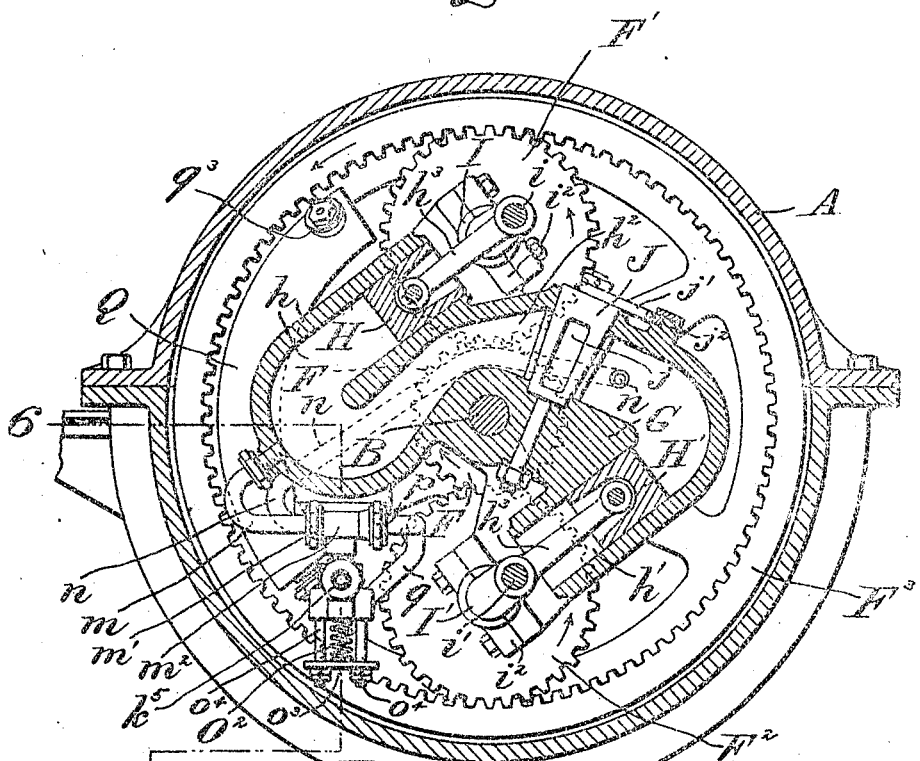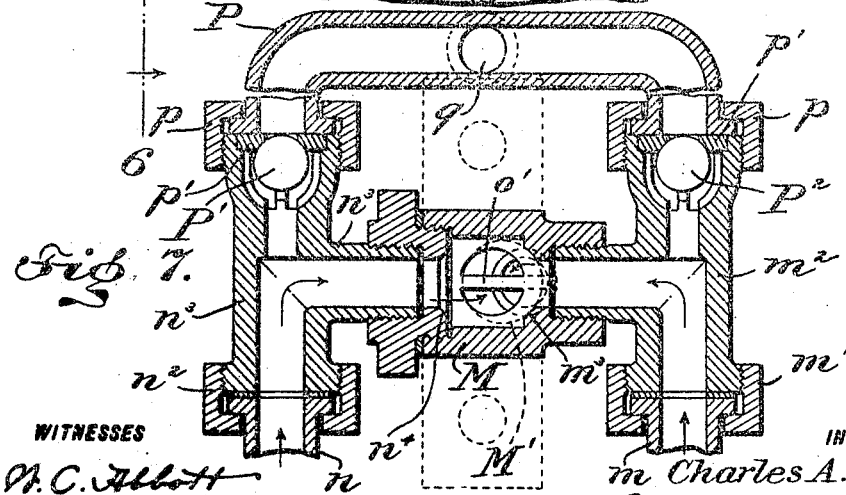

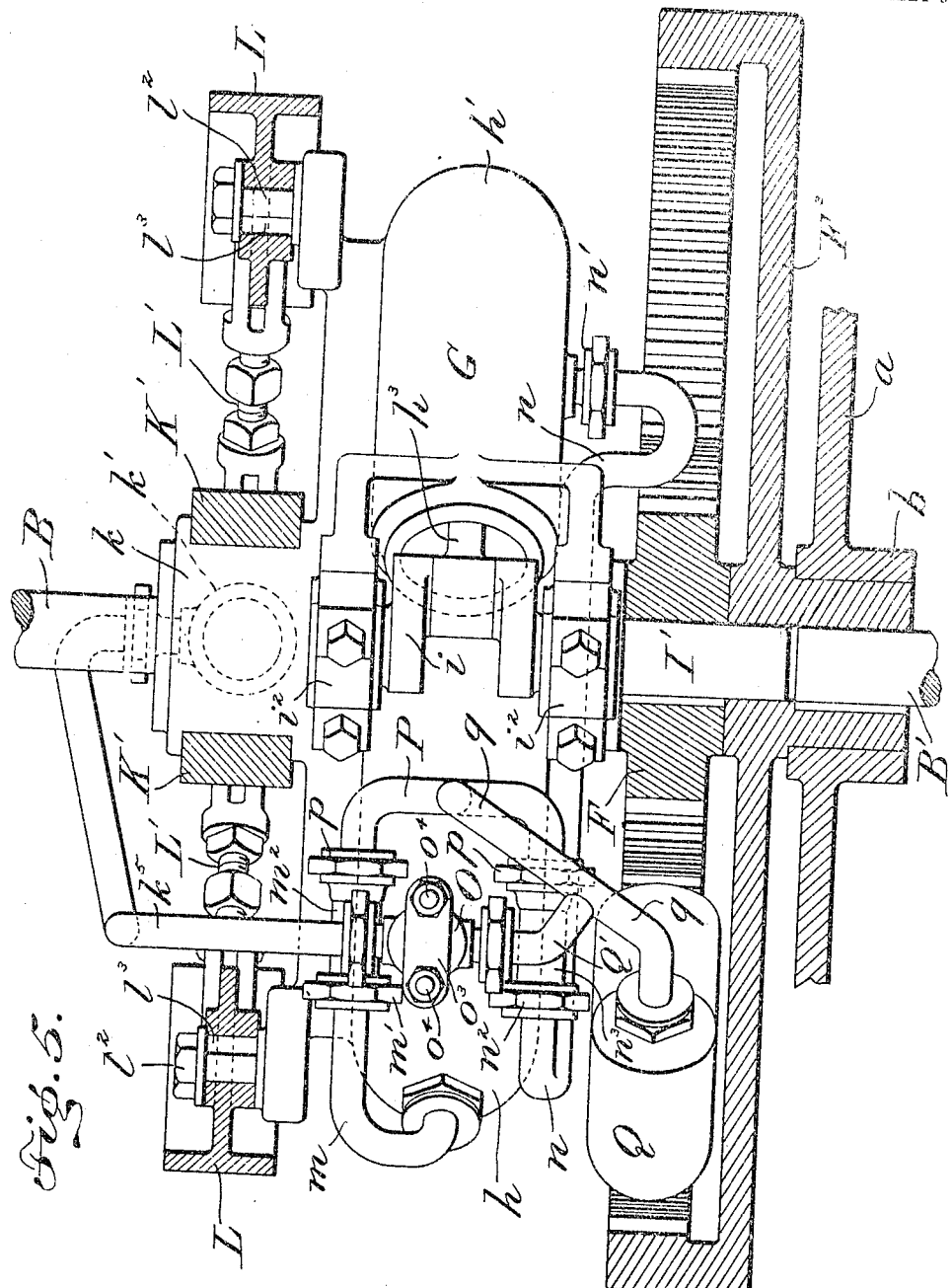

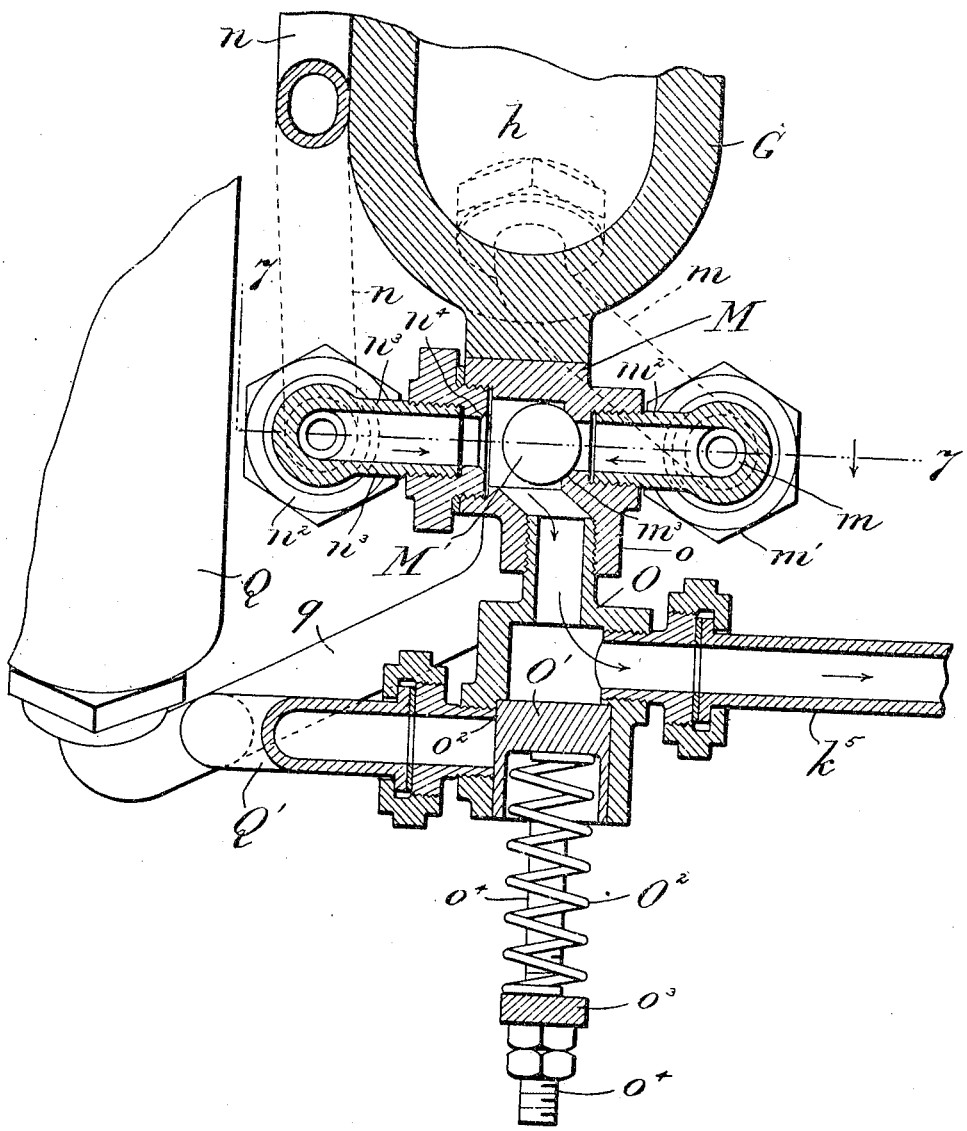

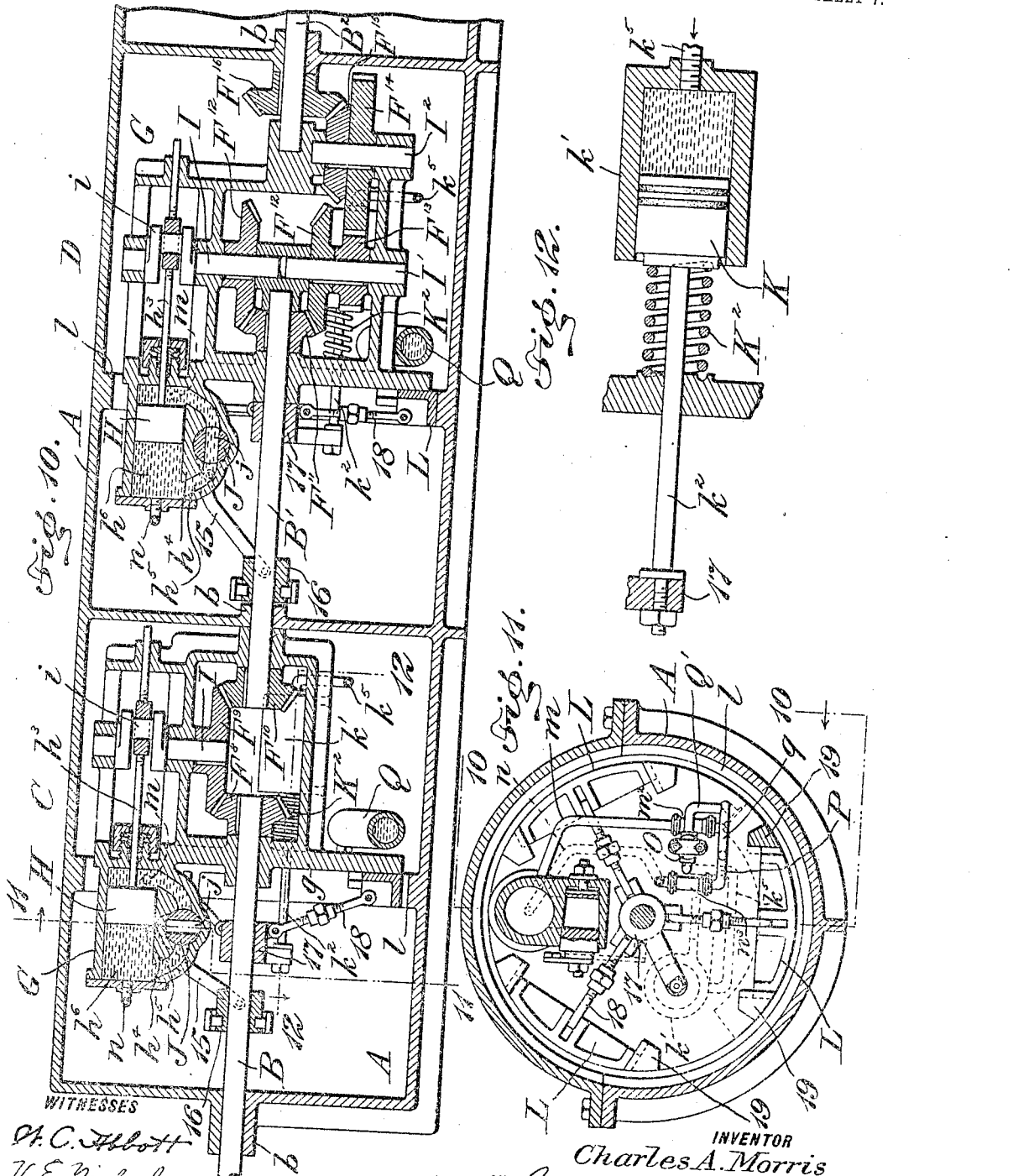

CHARLES A. MORRIS, OF BLOOMFIELD, NEW JERSEY, ASSIGNOR OF THREE-EIGHTHS TO CHARLES M. DIMM AND THREE-EIGHTHS TO LEONARD BROOKS, BOTH OF BROOKLYN, NEW YORK.

VARIABLE-SPEED TRANSMISSION-GEAR APPARATUS.

943,985.  Specification of Letters Patent.  Patented Dec. 21, 1909.

Application filed June 10, 1907.  Serial No. 378,209.

*To all whom it may concern:*

Be it known that I, CHARLES A. MORRIS, a citizen of the United States, residing in Bloomfield, county of Essex, and State of New Jersey, have invented a certain new and useful Variable-Speed Transmission-Gear Apparatus, of which the following is a specification.

This invention is a transmission gear apparatus wherein provision is made for changing the speeds easily and quickly without jar and undue vibration on the several elements at such periods of effecting the change to or from high, low and intermediate gears.

My new apparatus is constructed with a view to securing a positive transmission of power from one element or shaft to another element or shaft, and an important advantage of such apparatus consists in a smooth and steady operation of the several mechanisms under all conditions of service, both as a direct drive transmission or as a reverse drive transmission.

In a broad aspect, the invention embraces a driving member, a driven member, a train of gears intermediate of the aforesaid members, and means whereby a fluid resistance opposes the transmission of motion, power or speed through the aforesaid gear train and from the driving to the driven parts.

In one embodiment of the fluid resistance there is employed a fluid-containing pump or clutch, preferably loose on the driving member, and provided with piston-chambers, in which operate a pair of oppositely-movable pistons, said pistons being connected to oppositely-extending cranks or eccentrics which are provided on shafts, the latter carrying certain intermediate gears of the aforesaid train of gears. Said pump or clutch is charged with, or is adapted to contain, any appropriate resisting medium, such as a liquid, for example, glycerin or oil, and when the pistons are free to operate, said liquid is caused to circulate from one piston chamber to the other through a closed liquid circuit which is provided in the pump or clutch casing. For interposing resistance to the operation of the pistons, to the cranks or eccentrics, and to the intermediate gears of the train, provision is made for controlling the circulation of the liquid, such control being accomplished by the employment of a valve mechanism adapted to be operated by the attendant or chauffeur. The fluid resistance is under pressure at all times, and such pressure is utilized for the operation of a mechanical brake or clutch, the latter being held in a free or unapplied position by the pressure of the fluid, whereby the entire device is adapted to rotate as a unit with the driving member or shaft when it is desired to operate the driven member or shaft at the same speed as the driving member, the train of reducing gears between the two aforesaid members being idle or ineffective and the controlling valve being closed to shut off the circulation of the fluid through the piston chambers of the fluid pump or clutch. Said mechanical brake or clutch is equipped with means for setting or applying its shoes to or against a relatively fixed or stationary surface when the fluid is permitted to circulate by opening the aforesaid controlling valve, whereby the fluid pump or clutch is adapted to be locked in a fixed position by said mechanical brake or clutch and the pistons of said pump are operated by the cranks or eccentrics so as to force the fluid, the latter opposing resistance to the rotation of the cranks and certain gears of the train. With the pump or clutch cylinder locked in a stationary position by the mechanical brake or clutch, and the driving gear of the train operating the intermediate gears and parts associated therewith, the train of gears are adapted to transmit the motion of the driving shaft to the driven shaft at a reduced speed, determined by the ratio of the gears forming each train.

With the valve mechanism in a closed position, the fluid in the pump or clutch is held at rest and, consequently, the train of gears is locked, whereby the pump or clutch is adapted to transmit the motion of one shaft to the other. By adjusting the valve mechanism to a wide open position, however, the pistons are free to operate in the pump or clutch, so that the brake arrests the rotation of the frame or casting and the gear train is unlocked, whereby the train of gears operates to transmit the motion from one shaft to the other, the speed of the driven shaft depending upon the ratio of the gears one to the other in said train.

An important function of the valve mechanism is that it is capable of varying the speed between that of the driving shaft and that speed given to the driven shaft by the train of gears. Such variation is accomplished by adjusting the valve mechanism to different partially open positions so as to regulate the "slip" of the fluid in the clutch or pump, whereby the driven shaft may be operated at variable rates of speed by the manipulation of the said valve mechanism so as to interpose more or less resistance to the operation of the pistons and the gear train.

In my apparatus, provision is made for reducing the speed from the maximum speed of the engine shaft to the lowest speed of a final driven shaft, by employing a series or train of the hereinbefore described speed reducing devices, each of which embodies a fluid pump, a train of gears, and a fluid operated brake or clutch. Each of said speed reducing devices is adapted to reduce the speed in a certain proportion determined by the ratio of the train of gears of the said device, so that the exact speed of the final driven shaft may be determined, and, further, the speed may be varied by bringing one device or another of the series of devices into service, suitable selective mechanism being provided for such purpose. Furthermore, one of said speed reducing devices has a reversing gear train whereby the driven shaft may be rotated in an opposite direction to the driving shaft.

The invention embodies, further, the employment of means whereby fluid lost by leakage, or otherwise, may be replenished by automatically operating devices, so as to maintain in each pump or fluid clutch a sufficient quantity of liquid which insures the operation of said pump or fluid clutch.

Furthermore, the invention contemplates the provision of an automatic relief valve adapted, in the event of excessive pressure on the fluid, to open a by-pass from the pump or fluid clutch to a storage chamber or reservoir.

The transmission gear apparatus of this invention may be used in connection with various classes of machinery adapted to be driven without shock or jar and at variable speeds, but said apparatus is especially useful in connection with automobiles, in the practical operation of which it is necessary frequently to change the speed to and from the high, low and intermediate speeds, or vice versa, and, also, to reverse the direction of driving the vehicle.

In the accompanying drawings I have illustrated different practical embodiments of the invention, but the constructions shown therein are to be understood as illustrative, only, and not as defining the limits of the invention.

Figure 1 is a side elevation with parts broken away and in section showing one embodiment of my variable speed transmission gear apparatus, said figure showing, mainly, a selective mechanism by which either of a plurality of speed reducing gears may be brought into operation. Fig. 2 is a vertical longitudinal section taken in the plane of the dotted line 2—2 of Fig. 1 looking in the direction of the arrow, showing a reverse driving transmission and a direct driving transmission embodying this invention. Figs. 3 and 4 are vertical cross sections on the lines 3—3 and 4—4 respectively, of Fig. 2, looking in the direction of the arrow. Fig. 5 is an inverted or bottom plan view of the reverse driving transmission gear shown in Figs. 2 and 4, the gear train and certain of the parts being shown in horizontal section. Fig. 6 is a vertical section on an enlarged scale illustrating a fluid storage tank or reservoir and part of the pump or fluid clutch casing and relief valve and certain of the devices associated with the aforesaid parts, the plane of the section being indicated by the dotted line 6—6 of Fig. 4. Fig. 7 is a horizontal section on the line 7—7 of Fig. 6. Fig. 8 is an enlarged detail section through one form of filling valve adapted to be used in connection with the storage chamber or reservoir. Fig. 9 is a detail fragmentary view illustrating one means for operating a controlling or regulating valve employed in the fluid clutch or pump forming a part of each speed reducing device. Fig. 10 is a longitudinal section, partly in elevation, illustrating another embodiment of the variable speed transmission gear apparatus wherein I employ bevel gears in contradistinction to the trains of spur gears used in the speed reducing devices of Figs. 2, 3, 4, and 5 of the drawings, the plane of the section of said figure being indicated by the dotted line 10—10 of Fig. 11. Fig. 11 is a vertical cross section on the line 11—11 of Fig. 10 looking in the direction of the arrow. Fig. 12 is a horizontal cross section on the line 12—12 of Fig. 10.

A designates a stationary casing which incloses many of the working parts of my transmission gear apparatus. As shown, said casing is divided by transverse partitions, $a$, into a plurality of chambers. The ends of said casing, together with the partitions, $a$, therein, are provided with appropriate shaft bearings, $b$, which receive and support a plurality of shafts, herein designated as B, B', $B^2$, $B^3$, $B^4$, although the number of shafts may be increased or decreased as found expedient. Said shafts are arranged in alinement one with the other, and they are suitably supported in the bearings, $b$, so as to be independent one of the other. The shaft, B, is adapted to be propelled or driven, either directly or indirectly, by the motor or engine so as to have a predetermined speed. The speed of the shaft, B, is equal, substantially, to the maximum speed of the engine, whereas the shaft, B', is adapted to be driven by a speed reducing device at a slower speed than the shaft, B; the shaft, B², is driven at a still slower speed than the shaft, B', by another speed reducing device, and the shafts, B³, B⁴, are driven at still further reduced speed lower than the speed of the shafts, B² and B³, by still other speed reducing devices, so that the shaft, B⁴, will be the slowest driven shaft of the series.

Between the shafts, B, B', it is preferred to provide the apparatus with a speed reducing and reversing device, C, which operates to drive the shaft, B', in an opposite direction to the shaft, B. Another speed reducing device, D, is provided between the shafts, B', B², which operates to drive the shaft, B², in the same direction, but at a reduced speed, as the said shaft, B', the latter shaft in this instance being the driving shaft, while the shaft, B², is the driven shaft. Between the shafts, B², B³, is another speed reducing device, E, which is similar in construction to the device, D, intermediate of the shafts, B', B², and said device, E, operates to transmit the motion of the shaft, B², to the shaft, B³, at a reduced speed, although it drives said shaft, B³, in the same direction as the shaft, B². The speed reducing devices between the several shafts are identical in construction, except that the device, C, is equipped with a train of gears, one of which is an internal gear adapted to propel the shaft, B', in an opposite direction to the shaft, B, so that the device, C, serves both as a speed reducing and reverse driving device for the shaft, B'.

The several devices, C, D, E and E', are adapted to rotate with the shaft, B, under one condition of service, but either or all, of the devices may be brought into service for reducing the speed by the adjustment of an appropriate selective mechanism, whereby the device so brought into service will operate to propel one of the shafts, such as B', B², B³, or B⁴, at a rate of speed relative to the driven shaft determined by the ratio of the gears in the apparatus forming a part of the said device.

Two adjacent shafts constitute the driving and driven elements of the transmission apparatus. Thus, if the device, D, is in service, the shaft, B', is the driving shaft and B² the driven shaft; when the device, E, is employed, the shaft, B², is the driving shaft and B³ is the driven shaft, but should the device, C, be used, B is the driving shaft and said device, C, operates to drive shaft, B', at a reduced speed and in an opposite direction to said shaft, B.

I will now proceed to set forth in detail the construction of one of the speed reducing devices, selecting for this purpose the device, C, which is shown in Figs. 2, 3, 4, 5, 6, 7, 8 and 9.

On the shaft, B, is made fast a pinion, F, which meshes with other pinions, F', F², the latter in turn meshing with the internal teeth of a larger gear, F³. In Fig. 2, the hub, f, of said gear, F³, is shown as fitting the contiguous ends of the shafts, B, B', but said gear is loose on the shaft, B, and is made fast with the shaft, B', by a key, f', or other suitable device.

Loosely mounted on the shaft, B, is a main frame or casting G, the same forming the casing of a fluid clutch or pump, and constructed to carry several of the working parts which enter into the construction of each speed reducing device, C, D, E or E'. A part of this frame or casting, G, is formed with the piston chamber, h, h', which are arranged on opposite sides of the shaft, B, said chambers being connected at one end by a fluid passage or chamber, h², see Fig. 4, while their other ends are open, said open ends facing in opposite directions. Pistons, H, H', are fitted in the chambers, h, h', to operate therein, and the rods, h³, of said pistons are connected to the cranks or eccentrics, i, i', of shafts, I, I', the latter being journaled in bearings, i², of the frame or casting, G. Said crank shafts, I, I', carry the gears, F', F², and the rotation of the shafts and of the gears thereon, is determined by a fluid resistance to the movement of the pistons, H, H', said fluid being contained in the chambers, h, h', h², of the body, or casting, G.

J designates a controlling valve which is seated in the body or casting, G, at a suitable point across the connecting chamber, h², whereby the valve may be locked against fluid circulating between the piston chambers, h, h', and the pistons, H, H', are adapted to be held, practically, at rest by the resistance of such fluid when locked by the valve, J. Said valve may be of any suitable or appropriate construction, but it is shown as a conical plug valve adapted to have a ground seat in the body or casting, G. The valve is shown in Fig. 4 as having a transverse port, j, for the passage of fluid therethrough when adjusted to an open position, said port, j, being adapted to aline or register with the chamber, h². Suitable means should be provided for turning this valve, J, in its seat, and as one means for this purpose the valve plug is provided with a toothed sector, j', see Figs. 4 and 9. The sector meshes with the teeth of a rack, J', which is fitted in a guide, j², fixed within the stationary casing, A, one end of said rack being connected pivotally by a pin, j³, to a shipper arm, J², on a grooved collar, J³. Said grooved collar is mounted loosely on one of the shafts, and it is operated by a lever, J⁴, the latter being fulcrumed as at j⁴ on a bracket, j⁵, mounted within the casing, A, see Fig. 1.

With the valve, J, adjusted to a position in which its port, j, is in alinement with the chamber, h², the liquid contained in the body or casting, G, is forced from one piston chamber, h, through the passage, h², and into the other piston chamber, H', when the piston, H, is forced inwardly and the piston, H', is drawn outwardly by the operation of the cranks on the shafts, I, I', but when the piston, H', is moved inwardly and the piston, H, is drawn outwardly, the liquid is forced in an opposite direction from one piston chamber into the other piston chamber, whereby the shafts, I, I', may be rotated by the gear, F, meshing with the gears, F', F², the motion of the cranks and the pistons being cushioned by the fluid. By closing the valve, J, however, so as to move its port, j, out of register with this passage, h², the liquid is prevented from circulating from one piston chamber into the other, but as the gear, F, has a tendency to turn the gears, F', F², and the crank shafts, I, I', the pistons, H, H', tend to exert pressure on the columns of fluid contained in the body or casting, G, at the respective sides of the valve, J. The pressure of the fluid, whether free to circulate or locked against movement by the valve, J, is utilized for the operation of a mechanical brake or clutch which, under certain conditions, is free to rotate with the pump or fluid clutch heretofore described, but when the valve, J, is opened this mechanical clutch operates to hold the body or casting, G, in a stationary position so as to insure the operation of the train of gears and thereby propel one shaft at a reduced speed by motion derived from the other shaft. Said mechanical brake or clutch is shown more particularly in Figs. 2, 3 and 5 of the drawings, reference to which will now be made.

At or near one end of the body or casting, G, there is provided a substantially square guide member, k, and a cylinder, k', said cylinder being preferably integral with the body or casting, see Fig. 2. In said cylinder operates a piston, K, the rod, k², of which is connected with one end portion of a yoke, K', said yoke having its side bars fitted slidably to or in the guide member, k. Against the other end of the yoke are seated powerful coiled springs, K², which bear against the guide member, k, and tend to force the yoke, K', in one direction for the purpose of applying the brake shoes, L, into engagement with the brake face, l, provided interiorly of the stationary casting, A. Said brake shoes are fitted loosely on the end portions of a transverse guide bar, l', which projects outwardly from the casting, G, the said shoes being provided with bolts and nuts, l², for limiting the shoes to slidable movement on the guide, l'. The brake shoes are connected operatively with the yoke, K', by links, L', four of which are shown in Fig. 3, each link being pivoted at one end to the yoke and its other end to a shoe.

The connections between the fluid clutch or pump and the cylinder, k', of the mechanical brake or clutch are as follows:— From the piston chamber, h, of the pump leads a pipe, m, which has its other end united by a coupling, m', to an approximately T-shaped member, m², of a junction box, M. Another pipe, n, is coupled at n' to the casting, G, for communication with the other piston chamber, h', and the other end of this pipe is united by a coupling, n², to another T-shaped element, n³, of the junction box, M, see Fig. 7. The legs of the members, m², n³, are united to the box, M, by threaded couplings, and said box is provided with a depending nipple, o, to which is coupled a valve box or shell, O, see Fig. 6. From this valve or box shell extends a pipe, k⁵, which leads and is coupled to the cylinder, k', see Figs. 3 and 5. In the junction box, M, is suitable valve, M', which is adapted to prevent the fluid forced by one of the pump pistons from passing into the chamber of the other pump piston. As shown, the valve, M', is a ball check adapted to play in the junction box, M', between the members, m², n³, the said junction box having at adjacent ends of said members, seats, m³, n⁴, for the reception of said valve, see Figs. 6 and 7. The valve in its travel from one seat to the other plays across a bar, o', in an inlet to the valve shell, O, see Fig. 7, said valve being so proportioned that it does not in either of its positions close the inlet to the valve shell, O. The valve, M', is operated solely by the pressure of the fluid which is forced by the pump, and when one piston forces the fluid in one direction, as through the pipe, m, the valve is shifted to close the passage through the other pipe, n, thus preventing the fluid from passing to the other piston chamber, but permitting the pressure to be established in the piston cylinder, k', through the valve box, O, and the pipe, k⁵. The operation of opening the valve, J, permits the pump to operate, thus establishing a circulation of fluid in the pump and decreasing the pressure in the cylinder, k', whereupon the springs, K², move the yoke, K', endwise for the purpose of operating the links, L', and setting the shoes, L, into frictional engagement with the stationary brake surface, l, of the casing, A, said shoes being slotted at l³, and working easily over the bolts, l².

It will be noted that the pipes, m, n, are connected to one branch of the T-shaped members, m², n³, of the junction box, M. To the other branches of these members, $m^2$, $n^3$, are attached the ends of a cross pipe or union, P, by means of the couplings, $p$, the latter containing seats, $p'$, for the valves, $P'$, $P^2$. This cross pipe or union is provided with a pipe, $q$, which is attached at its other end to a reservoir, Q, the latter being mounted on a part of the frame or casting, G. Said reservoir is, preferably, of the curved form shown in Figs. 5 and 6 of the drawings so as to lie in compact relation to the gear, $F^3$, and it is adapted to contain a liquid for the purpose of replenishing the available working fluid in the chambers of the pump should the quantity of the liquid decrease owing to leakage, or from other causes.

The valve casing or box, O, is provided with a relief valve, $O'$, which is normally held closed on its seat, $o^2$, by means of a spring, $O^2$. Said spring rests on a cross plate, $o^3$, attached to the casting, G, by bolts, $o^4$, whereby the tension of the spring may be increased or diminished to make the relief valve open at the desired pressure. Said relief valve is seated below the part between the valve box, O, and the pipe, $k^5$, leading to the cylinder, $k'$, of the mechanical brake or clutch, so that the valve has no control over the fluid circulating from the pump to the cylinder, $k'$; but this valve, $O'$, normally closes the port of the by-pass, $Q'$, which connects with the pipe, $q$, at a point between its attachment to the reservoir, Q, and the cross pipe or union, P, see Fig. 5.

The valve, $M'$, in the liquid circuit from the double acting pump to the pressure cylinder of the mechanical brake or clutch, operates to equalize the pressure of the liquid which is forced by the two pistons of the pump, but normally the check valves, $P'$, $P^2$, are closed by the pressure of the fluid and the valve, $O'$, is held closed by its spring, O, or other retractor. Should the working fluid in the pump decrease by leakage, or other causes, the piston or pistons, H, $H'$, will establish a suction through one pipe or other, $m$, $n$, for the purpose of unseating the valve, $P'$ or P, and thus draw through the pipes, $q$, and $m$, or $n$, sufficient liquid from the reservoir, Q, to replenish the liquid in the pump to its full working capacity.

Owing to the high speed of the pump, there may, under some circumstances, be such pressure exerted on the fluid as will tend to break down the pump or other parts of the apparatus. The relief valve, $O'$, is set to open automatically, against the tension of its spring, $O^2$, for the purpose of permitting the fluid to be forced from the valve box, O, and the junction box, M, into the pipe, $Q'$, and thence to the reservoir, Q, in which the surplus liquid will accumulate until it is desired to utilize the same in the operation of the pump or the mechanical brake.

The reservoir, Q, should be provided with a suitable filling valve, $Q^2$, see Fig. 8. This valve has a stem, $q^2$, guided in a cage, $q^3$, which is attached to the reservoir, Q. Said cage has a filling port, $q^4$, into which may be passed the spout of a can, by pressing inwardly on which the valve, $Q^2$, may be pressed backward against the tension of the spring, $q^5$, thus enabling an operator to easily refill the tank, Q.

The levers, $J^4$, which operate the valves, J, of the speed reducing devices, D, E and $E'$, are adapted to be worked successively by the shipper rod, $J^5$, when it is moved endwise in one direction as indicated by the arrow, $x$, in Fig. 1. The shipper rod is adapted to operate, also, the lever, $J^6$, for the valve of the speed reducing and reversing device, C, but it is preferred to work the lever, $J^6$, for the device, C, by moving the shipper rod in an opposite direction.

Any appropriate means may be employed for operating the valve-shipper levers from a manually controlled device, such as the rod, $J^5$, but as shown, the rod is provided with racks 1, 2, 3, 4 and 5. With the rack 5 engages a gear 6 on a shaft 7 which is adapted to be operated by hand for the purpose of moving the rod, $J^5$, endwise in either direction. The racks 1, 2 and 3 of the rod are adapted to engage successively with toothed segments 8, 9, 10, each pivoted at 11 on a bracket 12. The shipper levers, $J^4$, have slotted ends loosely engaging with studs 13 of the segments, the latter being provided, also, with the locking studs 14 adapted to engage with a smooth edge of the shipper rod, $J^5$. The lever, $J^6$, of the speed reducing and reversing device, C, engages with a segment 15 which is adapted to mesh with the rack 4.

In Fig. 1, the levers, $J^4$, of the direct drive reducing devices, D, E, $E'$ are adjusted to open the valves, J, and enable the said devices to successively reduce the speed from the shaft, $B'$, to the shaft, $B^2$, and from the shaft, $B^2$, to the shaft, $B^3$, and thence to the shaft $B^4$ thus driving the shaft, $B^4$, at slow speed. The reverse driving device, C, in said Fig. 1 is clutched fast with the shafts B, $B'$, in order to rotate therewith so as to make the shaft, $B'$, rotate at the same speed and in the same direction as the shaft, B, the shaft, $B'$, being thus the driving member for the transmission apparatus.

The reversing and reducing device, C, has a train of gears, one of which is an internal gear, $F^3$, adapted to drive the shaft, $B'$, in an opposite direction to the shaft, B. Each of the direct driving devices, D or E, and others which may be employed, is equipped with a train of spur gears for propelling the driven shaft in the same direction as the driving shaft, of which driving and driven shafts there are several in the apparatus. As shown in Fig. 2, each direct driving speed reducing device between two adjacent shafts has a pump, a fluid-operated mechanical clutch or brake, a reservoir, Q, the several valve mechanisms, heretofore described, and a train of gears, the latter being shown by said Fig. 2 as consisting of the driving pinion, F⁴, keyed on one of the shafts, as B', the gears, F⁵, F⁵, fast with the crank shafts, I, I', which are mounted in the frame or casting, G, said shafts, I, I', being journaled in the bearings, i², i², of the frame or casting, G, and in bearings, r, of the spider, R, the gears, F⁶, F⁶, keyed on the shafts, I, I', and the gear, F⁷, fast with the driven shaft, as B².

It will be observed that in lieu of the train of reversing gears forming one element of the device, C, between the shafts, B, B', (said reversing gear including the internally toothed wheel, F³, as one of the elements), the direct drive speed reducing gearing comprised in each of the devices, D, E, E', consists of spur gears, one of which, F⁴, is fast with the driving shaft, another gear, F⁷, being fast with the driven shaft, B², and the intermediate gears, F⁵, F⁶, which are carried by the crank shafts, I, I', and mesh respectively with the driving and driven gears, F⁴, F⁷.

It is preferred to employ a spider, R, between two sets of gears in each speed reducing device, said spider having a hub which embraces loosely the contiguous ends of two shafts, such as B', B², see Fig. 2.

The preferred construction having been described, I will now proceed to set forth the operation thereof. Each speed reducing device, C, D, E, E', is charged with a suitable liquid, such as glycerin or oil, which fills the chambers, h, h', h², the pressure cylinder, k', of the mechanical clutch or brake, the reservoir or tank, Q, and the several pipes or passages connecting the aforesaid parts. With the valves, J, closed in the chambers, h², for the purpose of preventing the circulation of the fluid in the pump of each device, C, D, E, E', the fluid offers such resistance to the pistons, H, H', of each device that the crank shafts, I, I', cannot turn, in consequence of which the train of gears in each of the said devices is locked, and the pistons, H, H', exert such pressure on the fluid as will maintain the piston, K, of the mechanical clutch or brake in an outermost position, whereby the yoke, K', is actuated by the pressure of the fluid to prevent the brake or clutch shoes, L, from engaging with the casing, A. With the train of gears locked as described, each device, C, D, E, E', will cause the adjacent shafts to rotate at the same speed as the engine shaft, each device thus constituting a coupling between two adjacent shafts, whereby all the devices and the shafts will rotate with the speed of the engine shaft. When it is desired to rotate one shaft, as B', in an opposite direction to the shaft, B, the device, C, is brought into operation at such time as the other devices D, E, E', are working to drive the shaft, B⁴, at the high speed, said device, C, serving the purpose of a reversing mechanism between the shafts, B, B', for the purpose of ultimately driving the final shaft, B⁴, at a slower speed and reversely to the engine driven shaft, B. Assuming that shaft, B⁴, is rotating at the speed of the engine shaft, the attendant moves the shipper rod, J⁵, in an opposite direction to that indicated by the arrow, x, in Fig. 1, and the rack 4 engages the segment of the lever, J⁶, whereupon the valve, J, in the pump of the device, C, is turned and the pistons, H, H', are operated, thereby establishing circulation of fluid in said pump. This reduces the pressure in the cylinder, k', of the mechanical brake or clutch so that the powerful coiled springs, K², overcomes the resistance of the fluid in said cylinder, k', whereby said springs impart sliding movement to the yoke, K', and operate the links, L', for the purpose of forcing the shoes, L, into frictional engagement with the casing, A. The mechanical brake or clutch thus arrests the rotation of the frame or casting, G, because the latter is clutched firmly to the stationary casing, A, the shaft, B, turning freely in said casing. This permits the pistons, H, H', to work in the chambers, h, h', of the pump, and said pistons are driven from the shaft, B, through the gear, F, the gears, F², and the crank shafts, I, I', said pistons tending to force the fluid back and forth from one chamber to the other of the pump, and through the passage or chamber, h², of said pump. With the frame or casting, G, in a locked position and the pistons operating in the pump the train of reversing gears, F, F', F², F³, operate to transmit the motion and power from the shaft, B, to the shaft, B', the internal gear, F³, operating to drive the shaft, B', in an opposite direction to the shaft, B, and the other devices, D, E, E', driving the several shafts so as to propel the shaft, B⁴, at a slower speed and in an opposite direction to shaft, B.

Under ordinary conditions of service the reversing mechanism, C, does not operate to reverse the shaft, B', because the valve, J, is closed so that said device, C, merely couples the shafts, B, B', together for rotation as a unit. With all the valves J closed, the devices, D, E, E', rotate as a unit with the shaft B, for the purpose of driving the shaft, B⁴, in the same direction, and at the same speed, as the shaft, B, but the speed of the shaft, B⁴, may be reduced by opening the valve, J, in one or more of the devices, D, E, E', the reduction in speed depending upon the number of said devices, D, E, E', which may be brought into service. The device, D, is brought into service as a speed reducing gear by moving the shipper rod, J⁵, in the direction of the arrow, x, and the rack 1 operates a segment 8 and the lever, J⁴, to open the valve, J, in the pump of said device, D, whereby the pistons of the pump are operated by the gear, F⁴, on the shaft, B', driving the gears, F⁵, which operate the shafts, I, I', so as to drive the pistons. The circulation of the fluid thus established in the pump of the device, D, reduces the pressure in the cylinder of the mechanical clutch or brake, thus permitting the springs, K², of said device, D, to force the shoes, L, into engagement with the stationary casing, A, whereby the frame or casting, G, of the device, D, is locked in place, and the train of gears, F⁴, F⁵, F⁶, F⁷, of said device, D, transmit the motion and power from the shaft, B', to the shaft, B², thus driving said shaft, B², in the same direction as, and at a reduced speed relatively to, said shaft, B'. In addition to bringing the device, D, into service the operator may still further shift the rod, J⁵, in the direction of the arrow, x, and make the rack 2 engage with the segment 9, thereby opening the valve, J, in the pump of the device, E, whereupon the operation heretofore described in connection with the device, D, is repeated in the device, E, for the purpose of driving the shaft, B³, in the same direction as the shaft, B², and at a still further reduction in the speed; and the described operations of the devices, D, E, may be repeated in connection with the device, E', by still further moving the shipper rod, J⁵, for the purpose of bringing the rack 3 into engagement with the segment 10, thus securing a further reduction of the speed of the final driven shaft, B⁴.

As heretofore stated, the device, C, may be brought into service while the devices, D, E, E', are in use for reducing the speed, whereby the device, C, is adapted to drive the shaft, B⁴, in an opposite direction.

While I have set forth generally the operations of the several speed reducing mechanisms, it will be understood that in each device the several valves, M', P', P², and O', operate in the manner heretofore described with a view to controlling the circulation of the fluid so as to avoid interference of one pump piston with the other pump piston, to establish the necessary quantity of fluid in the pump and the several connecting passages, and to avoid excessive pressure on the circulating fluid, but it is not considered necessary at this point to recite in detail the operations of the several valves.

As heretofore described, each device, C, D, E or E' serves, merely, as a clutch between two shafts when the valve, J, is closed, and as a power transmitter when the valve, J, is opened, it being assumed that the valve, J, is opened to its full limit in order that the fluid clutch of said device will operate to its full capacity. With the valve, J, in its wide open position, the device transmits the motion of one shaft to the next shaft at a reduced speed determined by the ratio of the gears in the train between said shafts. The valve, J, may, however, be opened only part way for the purpose of regulating the quantity of fluid pumped from one chamber to the other of the fluid clutch, whereby the mechanical brake may be operated so as to secure a certain amount of slip between the brake shoes, L, and the casing, A, and at the same time the speed of the gears in the train may be varied. Such operation of the valve, J, when partly opened makes provision for variation of the speed from one shaft to the other within or between the limits established by the ratio of the gears of the train in each device between said shafts, such variation of the speed depending upon the volume or the "slip" of the fluid in the fluid clutch or pump. For example, should the shaft, B, or B', rotate at a speed of 1600 revolutions per minute and the device, D, be geared to reduce the speed of the shaft, B², to 1200 rev. per minute when the valve, J, of said device, D, is wide open, then by partly opening said valve, J, the speed of shaft, B², may be varied between 1600 and 1200 rev. per minute, such variations of the speed being dependent upon the amount of slip of the liquid in the fluid clutch or pump of said device, D. This variation of speed may be effected in each of the several devices, D, E or E', by appropriate adjustment and manipulation of the valve operating mechanism.

It is desirable frequently to allow all the devices, C, D, E and E', to operate idly so far as driving the shaft B⁴ is concerned, in order that an automobile or other apparatus may be stationary while the engine is running. This end is accomplished by adjusting the valve, J, to a partially open position in the device, D, so as to enable the mechanical brake of said device, D, to slip relative to the casing, A, and as the other devices, E, E', are controlled by or from the device of the shaft, D, said devices, E, E', remain idle.

Although I have described the reverse driving mechanism, C, as adapted, when the valve, J, is opened, to reduce the speed of the next driven shaft, B', such reduction of speed of the shaft, B', is optional. The gear train of the device, C, may be proportioned to propel the shaft, B', at the same speed as, although in a reverse direction to, the engine driven shaft, B, in which case the other device or devices, D, E, E', are relied upon to secure the desired reduction in the speed when the apparatus is adjusted for the reverse drive.

The apparatus shown in Figs. 1 to 9 inclusive, employs spur gearing for transmitting the motion from one shaft to another, but it is evident that bevel gearing may be employed for this purpose, substantially as indicated in Figs. 10, 11 and 12 of the drawings. Between the shafts, B, B', is a speed reducing and reversing mechanism, C, employing a train of bevel gears which may be described as follows: A bevel pinion, $F^8$, is secured to the shaft, B. Said bevel pinion meshes with a bevel gear, $F^9$, which is carried by a crank shaft, I. Said crank shaft is adapted to be locked by the resistance of a fluid in a pump mechanism contained in a casing, G, the latter being shown as having a member, $g$, mounted loosely on the shaft, B. When the shaft, I, and the bevel gear, $F^9$, are free to rotate by the circulation of the liquid in the pump mechanism, said gear, $F^9$, transmits the motion of the shaft, B, to a bevel gear, $F^{10}$, which is fast on an end portion of the shaft, B'. The device, C, embodies substantially the elements of the corresponding device, C, in Figs. 1 to 9 inclusive, but the parts are arranged somewhat differently as will now be described. The frame or casting, G, is provided with a chamber, $h^6$, in which is a fixed ledge, $h^4$, adapted to produce a by-pass, $h^5$, which connects the respective ends of the chamber, $h^6$, around the ledge or plate, $h^4$. In the chamber, $h^6$, operates a piston, H, the rod of which is connected with the crank, $i$, of the shaft, I. The by-pass, $h^5$, is controlled by a valve, J, which is operated by a lever 15, the latter being connected with the collar 16 which is slidable on the shaft, B, and is adapted to be operated by suitable means, such as the lever, $J^6$, of Fig. 1. With the respective end portions of the piston chamber, $h^6$, communicate the pipes, $m$, $n$, shown in full and dotted lines in Fig. 11, said pipes being connected with the junction box, M, the respective end portions of which are united by the union, P, said parts containing the valves heretofore described. From the safety valve casing, O, extends the pipe, $k^5$, which leads to the cylinder, $k'$, of the mechanical clutch or brake, and in this cylinder operates the piston, K, see Fig. 12. The motion of the piston in one direction is opposed by the spring, $K^2$, but the piston is forced against the pressure of this spring by the fluid which is admitted to the cylinder, $k'$, by the pipe, $k^5$. The rod, $k^2$, of the piston is, in the example shown, connected with a sliding collar 17, the latter being mounted loosely on the shaft, B, as shown in Figs. 10 and 11. Pivoted to this sliding collar are the toggles 18 which are connected with the brake shoes, L, three of said shoes being shown in Fig. 11. The shoes are slidably mounted in guides 19 which are provided on the member, $g$, of the frame or casting, G, and said shoes are adapted to engage with the friction surface, $l$, of the stationary casing, A. The liquid is adapted to be supplied through the valved union, P, from a reservoir or tank, Q, the latter being carried by the member, $g$, of the frame or casting. The operation of the device, C, shown in Figs. 10 and 11 is quite similar to that heretofore described in connection with the corresponding device, C, of Figs. 1 to 9 inclusive. Fig. 10 represents, also, another form of the devices, D, E, or E', for transmitting the motion of the shaft, B', to the shaft, $B^2$, whereby the latter is driven in the same direction as the shaft, B', and at a reduced speed. Said device, D, of Fig. 10 embodies the same elements as the device, C, except that the train of bevel gears is constructed and arranged to drive the shaft, $B^2$, in the same direction as the shaft, B'. For this purpose the following style of gearing is employed: A bevel gear pinion, $F^{11}$, is secured on the shaft, B', so as to mesh with bevel gears, $F^{12}$, on the shafts, I, I'. The shaft, I', has a spur gear, $F^{13}$, which meshes with a spur gear, $F^{14}$, on a counter shaft, $I^2$, the latter being journaled in a part of the frame or casting, G. Said shaft, $I^2$, has a bevel gear, $F^{15}$, which meshes with a bevel pinion, $F^{16}$, on the shaft, $B^2$. The crank, $i$, of the shaft, I, is connected with the piston, H, arranged to work in the chamber, $h^6$, the circulation of the fluid in which is controlled by a valve, J, operated in a manner heretofore described in connection with the device, C, of Fig. 10. The pump is connected with the cylinder of the mechanical brake or clutch, and the latter is adapted for engagement with the casing, A, so as to lock the frame or casting, G, when it is desired to bring the train of bevel gearing into service for transmitting the motion of the shaft, B', to the shaft, $B^2$.

Although I have shown herein, various alterations of my apparatus for transmitting power and reducing speed, it will be understood that many other embodiments in the form, size, proportion and arrangements of parts may be made by a skilled constructor without departing from the spirit, or sacrificing any of the advantages, of this invention.

Having thus fully described the invention, what I claim as new, and desire to secure by Letters Patent is:

1. In an apparatus of the class described, a driving member, a driven member, a fluid pump normally free with respect to said members, a gear train having certain gears thereof fast, respectively, with the driving and driven members, other gears of said train being mounted for rotation with said pump, means for locking the gear train from rotation through the action of said pump and causing said train and the pump to rotate as a unit with said driving and driven members, fluid-operated brake mechanism coöperating with the pump for restraining it from rotation, thereby permitting the gears of the train to rotate for transmitting the motion of one member to the other member, and means for retaining the brake mechanism in a substantially fixed position relative to the fluid pump, said brake mechanism being released by the action of the fluid in said pump.

2. In an apparatus of the class described, a driving member, a driven member, a train of gears intermediate said members, a rotatable fluid pump coöperating with said members and the gear train, said pump having means for restraining the fluid from circulating therein and causing the aforesaid gear train to be locked in fixed relation to the two members for rotation simultaneously and at equal speed therewith, and brake mechanism controllable by the fluid in the pump and operating to lock said pump in fixed position while permitting the fluid to circulate in said pump, whereby the gear train operates to transmit motion, at a different rate of speed, from one member to the other member.

3. In an apparatus of the class described, a driving member, a driven member, a train of gears intermediate said members, a fluid pump coöperating with said gear train and with the driving and driven members, said pump being adapted for rotation with the gear train and with said members at substantially the same speed, means for controlling the circulation of fluid in said pump, thereby locking and releasing the gear train whereby the latter when released operates to transmit motion at variable speed from one member to the other member, and a brake mechanism controllable by the fluid in the pump, said brake mechanism operating to lock said fluid pump in a substantially fixed position and to release said pump for rotation as a unit with the gear train and the aforesaid shafts.

4. In an apparatus of the class described, driving and driven members, a gear train intermediate said members, a rotatable casing normally free with respect to both members, means adapted to contain a fluid resistance for opposing the rotation of the individual gears of said train, whereby the gear train locks or couples the aforesaid members for rotation simultaneously at the same speed, said resistance-containing means being adapted for unitary rotation with said casing, the gear and the driving and driven members, and fluid operated brake mechanism in fluid communication with the resistance containing means and adapted to lock said casing against rotation, whereby the resistance is removed from the gear train and the latter is free to transmit the motion of one member to the other member, said brake mechanism embodying means, controllable by the fluid, for restraining the rotary motion of said casing.

5. In an apparatus of the class described, driving and driven members, a rotatable casing normally free with respect to both members, a gear train intermediate said members and adapted to rotate as a unit with the casing and said members, means carried by said casing and adapted to contain a variable fluid resistance for opposing the rotation of the individual gears of said train, whereby the gear train locks or couples the aforesaid members for rotation simultaneously, said resistance-containing means being adapted for unitary rotation with the gear train, the casing, and driving and driven members, and fluid operated brake mechanism in fluid communication with said resistance containing means and adapted to lock said casing from rotation, whereby the resistance is removed from the gear train and the latter is free to transmit the motion of one member to the other at a different speed.

6. In an apparatus of the class described, driving and driven members, a liquid-resistance piston-pump mounted loosely on one of said members for rotation freely thereon, said pump having separate piston chambers and a connecting passage intermediate said chambers, a gear train intermediate said driving and driven members, the pistons of said pump coöperating with certain gears of said train, a valve operating in said connecting passage of said pump for arresting and controlling the circulation of liquid therein, and means for restraining said pump from rotation with said gear train and the aforesaid members.

7. In an apparatus of the class described, driving and driven members, a liquid-resistance piston-pump mounted loosely on one of said members for rotation freely thereon, said pump having separate piston chambers and a connecting passage intermediate said chambers, a gear train intermediate said driving and driven members, the pistons of said pump coöperating with certain gears of said train, valve mechanism operating to arrest or control the circulation of liquid between the piston chambers of said pump, and a liquid resistance brake mechanism controllable to lock said pump in fixed relation to said gear train and to enable said pump to rotate at slow speed relative to that of the gear train.

8. In an apparatus of the class described, driving and driven members, a gear train intermediate said members, a liquid-resistance pump operatively connected with certain gears of said train and adapted to have unitary rotation with the aforesaid members and the gear train, means for controlling the circulation of liquid in said pump, and liquid-operated brake mechanism adapted to lock said pump from rotation with the gear train, said brake mechanism being actuated by liquid pressure of the aforesaid pump.

9. In an apparatus of the class described, driving and driven members, a gear train intermediate said members, a liquid pump for controlling the operation of said gear train, and a brake mechanism controllable by the liquid pressure of said pump for locking and releasing the latter, whereby said pump is adapted for rotation with said gear train and with the aforesaid members.

10. In an apparatus of the class described, driving and driven members, a gear train intermediate said members, a liquid pump for locking and releasing said gear train, means for regulating the circulation of fluid in said pump, and brake mechanism controllable by the liquid pressure established in said pump, whereby said pump is adapted for unitary rotation with said members and the gear train, or it may be locked in fixed position relative thereto.

11. In an apparatus of the class described, driving and driven members, a gear train intermediate said members, a liquid pump in coöperative relation to the members and the gear train and adapted to rotate in unison therewith, valve mechanism operating in the pump for arresting and controlling liquid adapted to circulate in said pump, whereby the liquid may be confined in the pump for locking the train of gears or the liquid may be permitted to circulate and the gears thereby be permitted to operate for transmitting the motion of one member to the other member, and brake mechanism operated by the liquid of the pump for restraining said pump from rotation relative to the aforesaid members and the gear train.

12. In an apparatus of the class described, driving and driven members, a gear train intermediate said members, means adapted to contain a liquid resistance for opposing the operation of the gear train, valve mechanism whereby the liquid is permitted to circulate and the gears are free to transmit the motion of one member to the other member, said fluid containing means being adapted for unitary rotation with said members and the gear train, and brake mechanism controllable by the pressure of the liquid and operating to lock the liquid containing means from rotation.

13. In an apparatus of the class described, driving and driven members, a gear train intermediate said members, means adapted to contain a liquid resistance for opposing the motion of the gear train, valve mechanism whereby liquid is held at rest and precludes the operation of said gear train, said valve mechanism operating also to control the circulation of the liquid resistance, thereby releasing the gear train and permitting it to operate for transmitting the motion of one member to the other member, said liquid-containing means being adapted for unitary rotation with said members when rotating at high speed, and brake mechanism controllable by the liquid pressure of the liquid containing means and adapted to lock the same from rotation when the gears are operating to transmit the motion of one member to the other member.

14. In an apparatus of the class described, driving and driven members, a gear train intermediate said members, a rotatable pump adapted to contain a liquid resistance, pistons operated by said gear train and adapted to circulate the liquid resistance from one piston chamber to the other of said pump, valve mechanism for holding the liquid at rest in the pump or permitting it to circulate therein under the action of said pistons, the action of said gears on the liquid resistance securing rotation of said pump with the members when the fluid is restrained from circulation therein, and a brake mechanism controllable by the pressure of said liquid for locking and releasing the rotatable pump.

15. In an apparatus of the class described, driving and driven members, a gear train intermediate said members, a rotatable fluid pump mounted loosely on one of said members, brake mechanism operated by liquid pressure of the pump for holding said pump at rest, the pistons of said pump being operated by the gear train for circulating the liquid resistance in said pump, and means for controlling the circulation of said liquid resistance, the circulation of liquid in the pump operating to release said brake mechanism, thereby permitting said pump to rotate with said gear train.

16. In an apparatus of the class described, driving and driven members, a gear train intermediate of said members, a rotatable pump adapted to contain a liquid resistance, crank shafts and pistons for securing a circulation of the liquid, a valve for shutting off and controlling the circulation of liquid, and liquid operated means for holding the pump at rest, said liquid operated means being held mechanically in a substantially fixed position and adapted to be released by the liquid in said pump.

17. In an apparatus of the class described, driving and driven members, a gear train intermediate of said members, a rotatable pump adapted to contain a fluid resistance, means for automatically maintaining a desired quantity of fluid in said pump and means for holding the pump or clutch at rest.

18. In an apparatus of the class described, driving and driven members, a gear train intermediate of said members, a fluid pump operated by the gear train, fluid operated brake mechanism for controlling the rotation of said pump, means for relieving the fluid in the pump and the brake mechanism from excessive pressure, and means for controlling the circulation of the fluid.

19. In an apparatus of the class described, driving and driven members, a gear train intermediate of said members, a pump adapted to contain a fluid resistance, said pump being operated by the gear train, means for controlling the circulation of the fluid, and means for maintaining a desired quantity of fluid in said pump.

20. In an apparatus of the class described, driving and driven members, a gear train intermediate said members, a rotatable liquid pump adapted to carry a part of the gear train, the liquid in said pump being adapted to oppose a variable resistance to the operation of said gear train, means whereby said rotatable pump and the gear train are made to rotate with both the driving and driven members, and brake mechanism adapted to retain the rotatable pump at rest and without affecting the rotation of the gear train, said brake mechanism being controllable by the liquid of said pump.

21. In an apparatus of the class described, driving and driven members, a gear train intermediate said members, a rotatable liquid pump adapted to carry certain gears of said train, the liquid contained in said pump presenting a variable resistance to the operation of the gear train, means whereby the rotatable pump and the gear train are locked together and with both driving and driven members for securing rotation of all the parts as a unit, and liquid operated brake mechanism controllable by the liquid in the pump and operating to hold the latter at rest while permitting the gear train to operate between said driving and driven members.

22. In an apparatus of the class described, driving and driven members, a gear train intermediate of said members, a rotatable member adapted to carry certain gears of said train, a liquid pump for locking the rotatable member, the gear train and the driving and driven members for rotation simultaneously, and brake mechanism controllable by the liquid in said pump and adapted to operate normally in holding said pump in a relatively fixed position while permitting the gear train to operate in transmitting the motion of the driving member to the driven member.

23. In an apparatus of the class described, driving and driven members, a gear train intermediate of said members, a rotatable member adapted to carry certain gears of said train, a liquid pump for locking the rotatable member, the gear train and the driving and driven members for rotation simultaneously, means for controlling the circulation of liquid in said pump, and brake mechanism operating to lock the rotatable member substantially in fixed position while the gear train is free to rotate, said brake mechanism being released by the action of liquid in the pump when said liquid is restrained from circulation therein.

24. In an apparatus of the class described, driving and driven members, a gear train intermediate of said members, a liquid pump adapted to rotate as a unit with the gear train, means for controlling the circulation of liquid in said pump, and brake mechanism operating to restrain the pump from rotating with said gear train, said brake mechanism being released when the liquid is restrained from circulating in the pump.

25. In an apparatus of the class described, driving and driven members, a gear train between said members, a rotatable liquid pump having connected piston chambers, the pistons of said pump being operated by said gear train, a valve between the piston chambers for controlling the liquid in said pump, and a liquid operated brake mechanism opposing the rotation of said pump, said brake mechanism having liquid connection with said pump.

26. In a transmission mechanism, driving and driven members, a gear train intermediate said members, a liquid pump the pistons of which are operated by the motion of the gear train, valve mechanism adapted to control the circulation of liquid in said pump, and brake mechanism adapted to restrain the pump from rotation with the gear train, said brake mechanism being controllable by the liquid of said pump.

27. In an apparatus of the class described, driving and driven members, a gear train between said members, a rotatable fluid pump operated by said gear train, means for controlling the fluid in said pump, a mechanical brake adapted to rotate with the fluid pump, and fluid operated means for setting and releasing the mechanical brake.

28. In an apparatus of the class described, driving and driven members, a gear train between said member, a double acting fluid pump operated by said gear train, means whereby the fluid may be held at rest or permitted to circulate in said pump, a fluid reservoir, a fluid-actuated mechanical brake, and valves for controlling the direction of circulation of the fluid.

29. In an apparatus of the class described, driving and driven members, a gear train between said members, a double acting fluid pump operated by said gear train, means whereby the fluid may be held at rest or permitted to circulate in said pump, a fluid reservoir, and a relief valve whereby excessive pressure on the fluid directs the latter into said reservoir.

30. In an apparatus of the class described, driving and driven members, a gear train between said members, a double acting fluid pump operated by said gear train, means whereby the fluid may be held at rest or permitted to circulate in said pump, a fluid-actuated mechanical brake for locking the fluid pump, and valve mechanism whereby the fluid is caused to circulate in a predetermined path relative to the fluid pump.

31. In a transmission mechanism, a plurality of speed reducing devices each embodying a liquid pump, a train of gears controllable by the pump, and brake mechanism operated by the liquid of said pump, a driving member and a driven member in coöperative relation to one of said speed reducing devices, other driven members also coöperating with other speed reducing devices, and means whereby each of the speed reducing devices may be brought into or cut out of action.

32. In a transmission mechanism, a plurality of speed reducing devices each of which embodies a valve-controlled liquid pump, a gear train controllable by said pump, and brake mechanism operated by the liquid of said pump, a driving member and a driven member coöperating with one of the speed reducing devices, a plurality of other driven members adapted to be operated by other of said speed reducing devices, and means for successively bringing the speed reducing devices into action.

33. In a transmission mechanism, a plurality of speed reducing devices each having a valve controlled rotatable liquid pump, a gear train, and brake mechanism controllable by the liquid in said pump, a driving member and a driven member coöperating with one of said speed reducing devices and adapted for rotation as a unit therewith, other driven members coöperating with other of said speed reducing devices, and means whereby the valves of said speed reducing devices may be operated for bringing said devices into action, thereby transmitting the motion of one member to the next adjacent member at a different speed.

34. In a transmission mechanism, a plurality of speed reducing devices each including a rotatable valved liquid pump and a gear train operating conjointly to couple certain members for rotation simultaneously, a driving member and a driven member coöperating with one of said speed reducing devices, other driven members adapted to be operated in turn by other of said speed reducing devices, and means for operating successively the valves in the pumps of said speed reducing devices, whereby each device is adapted to be operated by one of said members for propelling the next adjacent member at less speed.

35. In a transmission mechanism, a driving member and a driven member, a plurality of speed reducing devices, one of said devices operating to propel the driven member in an opposite direction from that of the driving member, other driven members coöperating with other of said speed reducing devices, and means for bringing the several speed reducing devices into action at will for the purpose of propelling each of said driven members from, and at less speed than, the next preceding member.

36. In a transmission mechanism, a plurality of speed reducing devices each including a liquid pump, a train of gears, and brake mechanism controllable by the pressure of said pump, a driving member and a driven member coöperating with one of said speed reducing devices, other driven members also coöperating with other of said speed reducing devices, means whereby said speed reducing devices are adapted to couple adjacent members for rotation simultaneously, and means for operating the liquid pumps of the aforesaid devices whereby the successive devices propel the successive members at less speed than the members which precede them.

37. In a transmission mechanism, a plurality of speed reducing devices each having a valve controlled liquid pump and a gear train, a driving member and a driven member coöperating with one of said speed reducing devices and adapted to be coupled thereby for rotation as a unit, other driven members also coöperating with other of said speed reducing devices, and means for successively operating the valves in the pumps of the speed reducing devices, whereby the successive speed reducing devices operate to cause the successive members to rotate at reduced speeds.

38. In a transmission mechanism, a driving member and a driven member, a plurality of speed reducing devices one of which coöperates with the driven member and the driving member, other driven members coöperating with other of said speed reducing devices, one of said speed reducing devices operating, also, to propel one of the driven members reversely to the next preceding member, means for controlling said speed reducing devices to couple the aforesaid members for rotation simultaneously, and means whereby the reversing and reducing device may be brought into independent action and operating, also, to adjust the other speed reducing devices successively for causing the successive members to be driven at progressively reduced speeds.

39. In an apparatus of the class described a plurality of shafts, a plurality of devices coupling adjacent shafts for rotation simultaneously, and means for operating said devices at will, each device comprising a train of reducing gears, a valve controlled rota- 40. In an apparatus of the class described, a plurality of shafts, a plurality of devices coupling said shafts for rotation simultaneously, and means for operating said devices at will, one of said devices having a train of reversing gears, each device being provided with a fluid pump, a gear train, and a brake mechanism controllable by said pump for locking and releasing the gear train associated with the pump.

41. In an apparatus of the class described, a plurality of shafts, devices adapted to couple said shafts for rotation simultaneously, each of said devices comprising a train of speed reducing gears between two of said shafts and a valve controlled liquid pump for locking and releasing said gear train, and operating mechanism coöperating directly with the valves in the pumps of said coupling devices whereby the latter may be caused to operate the successive shafts at progressively reduced speeds.

42. In an apparatus of the class described, a plurality of alined shafts, a speed reducing and reversing device between two of said shafts, other speed reducing devices between each pair of adjacent shafts, and means whereby the aforesaid devices may be brought into operation at will.

43. In an apparatus of the class described, a plurality of alined shafts, speed devices between the shafts, and operating means for the said devices, each device comprising a train of gears, fluid pumps for locking and releasing the gears, means for controlling the fluid in the pumps, and brake mechanism controllable by pressure in the pump for locking said pump while the gear train is in operation.

44. In a transmission mechanism, a series of shafts, a train of gears operating to connect each pair of adjacent shafts, a liquid pump coöperating with each train of gears, a valve associated with each pump for precluding circulation of liquid therein whereby the pump may rotate simultaneously with the gear train and, also, with said pair of adjacent shafts, means for restraining the pump from rotation with the gear train upon opening said valve, whereby the gear train operates to transmit motion from one shaft to the other of the pair of adjacent shafts, and means operated at will for opening said valves in order that the gear trains and pumps may operate successively in reducing the speed of the successive shafts.

45. In a transmission mechanism, a plurality of shafts, a plurality of gear trains each connecting two of said shafts, a liquid pump coöperating with each gear train, liquid operated means adapted to restrain each liquid pump from rotation with its appropriate gear train, a valve adapted to control the circulation of liquid in each pump, and means for operating said valves.

46. In a transmission mechanism, a plurality of shafts, a plurality of gear trains each connecting two adjacent shafts, one of said gear trains being adapted to propel one shaft in an opposite direction from that of the next shaft, a pump coöperating with each gear train, means for retaining the pump in a state of rest, valve mechanism for controlling the fluid in each pump, and means for operating said valve mechanisms at will whereby the reverse gear train may be operated and the other gear trains may be brought successively into service.

47. In a transmission mechanism, a driving member, a driven member, a gear train intermediate said members, a liquid pump coöperating with the gear train, liquid operated means for restraining said pump from rotation, means whereby the liquid in the pump may be replenished to compensate for leakage, and valve mechanism for controlling the liquid in said pump.

48. In an apparatus of the class described, driving and driven members, a reversing gear train between said members, a fluid pump operated by the gear train, and means for locking and releasing a column of fluid in said pump.

49. In an apparatus of the class described, driving and driven members, a gear train between said members, said train having an internal gear adapted to propel the driven member in an opposite direction to the driving member, a fluid pump operated by the gear train, and means for controlling the circulation of fluid in said pump.

In testimony whereof I have signed my name to this specification in the presence of two subscribing witnesses.

CHARLES A. MORRIS.

Witnesses:
Jas. H. Griffin,
H. I. Bernhard.